United States Patent Office 3,657,285
Patented Apr. 18, 1972

3,657,285
WATER INSOLUBLE BLUE ANTHRAQUINONE DYES FOR CELLULOSIC AND SYNTHETIC FIBERS
John Blackwell, Kennett Square, Pa., assignor to E. I. du Pont de Nemours and Company, Wilmington, Del.
No Drawing. Continuation-in-part of application Ser. No. 879,900, Nov. 25, 1969. This application Dec. 22, 1970, Ser. No. 100,798
Int. Cl. C09b 1/32
U.S. Cl. 260—381
2 Claims

ABSTRACT OF THE DISCLOSURE

Water insoluble blue anthraquinone dyes, useful for dyeing cellulosic or synthetic fibers or blends or mixtures thereof, having the formula

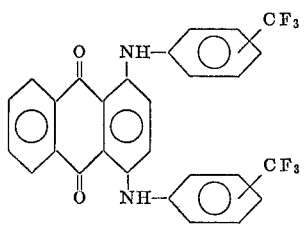

CROSS-REFERENCE TO RELATED APPLICATION

This is a continuation-in-part of copending application Ser. No. 879,900 filed Nov. 25, 1969.

BACKGROUND OF THE INVENTION

(1) Field of the invention

This invention relates to water insoluble blue anthraquinone dyes which have utility in the dyeing of a broad spectrum of synthetic and natural materials, especially water swellable cellulosic materials, or mixtures or blends of such synthetic and natural materials.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of lower water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process is U.S. Pat. 3,313,590. Analogous to the dyeing of such blends and confirming the aforesaid distinction between water swellable cellulosic materials and non-water swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulose materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limidi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound.

A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

(1) Water in an amount sufficient to swell the cellulose;

(2) A preformed dye in an amount sufficient to color the cellulose, a boiling saturated solution of which dye in 0.1 molar aqueous sodium carbonate exhibits an optical absorbance not in excess of about 30; and (3) A solvent in an amount sufficient to maintain swelling of the cellulose if water is removed, and which (a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula

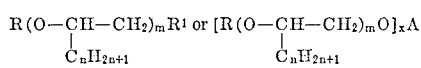

wherein $n$ is 0 or 1;
$m$ is a positive whole number;
R is H, $C_{1-8}$ alkyl, $C_{7-15}$ aralkyl or alkaryl,

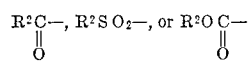

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is —OH, —$OR^2$, —$SR^2$, —$NHR^2$, —$NR^2(C_{1-8}$ alkyl), —$NR^2(C_{7-15}$ aralkyl or alkaryl),

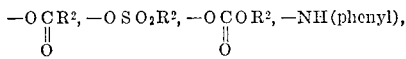

or —NH(naphthyl), wherein $R^2$ is as defined above;
$x$ is the number of unsatisfied valencies in A; and
A is , —$CH_2CHORCH_2$—, —$CH_2\overset{|}{C}HCH_2$—

—$CH_2C(CH_2OR)_3$, (—$CH_2)_2C(CH_2OR)_2$
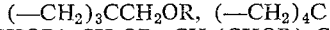
—$CH_2(CHOR)_yCH_2OR$, $CH_2(CHOR)_yCH_2$—, or
—$CH_2(CHOR)_{y-z}(—CH)_z$—$CH_2$— in which $y$ is 2, 3 or 4; $z$ is 0, 1, 2, 3 or 4 but no greater than $y$; and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

The dyeing or printing of synthetic fibers with 1,4-bis (haloanilino)anthraquinones is disclosed in French Pat. 1,571,171. When such dyes are employed in dry transfer-color printing of synthetic fabrics, as described in American Dyestuff Reporter, May 19, 1969, pp. 28–30, weak prints may be obtained.

OBJECTS AND SUMMARY OF THE INVENTION

It is an object of the present invention to provide blue water insoluble anthraquinone dyes which are useful in the above-described process of Blackwell et al. for dyeing water swellabe cellulosic materials and blends or mixtures thereof with synthetic materials. It is a further object to provide dyes which exhibit good fastness to light, washing and crocking when applied to water swellable cellulosic materials, synthetic materials or blends or mixtures of such cellulosic and synthetic materials. Another object is to provide disperse anthraquinone dyes which are useful for dyeing synthetic materials by conventional procedures. Still another object is to provide 1,4-bis(anilino)anthraquinones which are useful in dry transfer-color printing of synthetic fabrics.

In summary, the present invention resides in the discovery of dyes having the formula

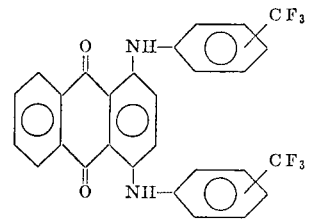

DETAILED DESCRIPTION OF THE INVENTION

The aforesaid blue anthraquinone dyes of this invention may be prepared by conventional processes and techniques. As an example of such processes and techniques, o-, m- or p-bromobenzotrifluoride can be heated with 1,4-diaminoanthraquinone, in the molar ratio of at least 2:1, in an inert high-boiling solvent such as nitrobenzene. Alkali metal carbonates and acetaates may be used as acid acceptors, and it may be advantageous to add small amounts of copper and cuprous salts to enhance the reaction rate.

The m-trifluoromethylanilino dye of this invention can be prepared more conveniently and economically by the condensation of m-aminobenzotrifluoride with leuco-quinizarin, or a mixture of quinizarin and leuco-quinizarin, in the molar ratio of at least 2:1, by heating with boric acid in a suitable solvent such as chlorobenzene, Cellosolve, oxybis(2-ethylacetate), 1-pentanol or an excess of the amine itself. The condensation reaction may advantageously be carried out under nitrogen to prevent oxidation of the leuco-quinizarin before the condensation reaction is complete.

The cellulosic materials which can be dyed with the dyes of this invention by the previosuly-described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with dilute aqueous caustic or the dyeing can be carried out in the presence of wetting agents, preferably of the nonionic type, which assist penetration of the fibers by the dye solvent. Mixtures of cotton and rayon fibers can be dyed, and the present dyes also can be used to dye purified wood pulp and paper. Excluded as the water swellable cellulosic material, as considered herein, is cellulose acetate which does not exhibit the requisite swellability in the presence of water.

The synthetic materials which can be dyed with the dyes of this invention include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol, aqueous dyeing or dry transfer-color printing procedures.

The dyes of this invention can be applied to water swellable cellulosic materials, or to blends or mixtures thereof with synthetic materials by the above-described Blackwell et al. process. The dyes of this invention are particularly useful for dyeing mixtures and blends of cotton and polyester or polyamide, such as mixtures containing 65 to 80% polyethylene terephthalate and 20 to 35% cotton. In such mixtures, the synthetic material is dyed using conventional process conditions. Since the dyes of this invention can be used to dye both components in a blend or mixture, scourability as a factor in dye selected is avoided since the previously-described cross-staining problem has been minimized.

The dyes of this invention dye the substrate directly, this is, they do not require oxidation, reduction, hydrolysis, or any other chemical modification for development of color or fastness. The dyes exhibit excellent fastness to light, crocking, washing and drycleaning; they can be isolated in highly crystalline form and can be milled easily to fine aqueous dispersions.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye pad bath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dye baths used in practicing this invention also can contain dyes other than those of this invention; for example, direct dyes or fiber-reactive dyes for cotton or for polyamides can be present for shading purposes.

In the preferred dyeing procedure with the dyes of this invention, can aqueous dye dispersion and organic solvent are applied to the fabric from a single padbath. The amount of water in the padbath usually is 70–95% weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

The following experiments show the utility of the dyes of this invention.

Dyeing 65–35 "dacron" polyester/cotton blend fabric (A) A padbath was prepared from: Grams
An aqueous blue dye paste (15% active ingredient) containing the dye of Example 1 ____ 50
Purified vegetable gum thickener _____ 20
Methoxypolyethylene glycol (molecular weight 350) _____ 100
Water to 1 liter.

A continuous length of 65/35 "Dacron" polyester/cotton fabric was padded at 60% uptake, based on the weight of the fiber, and the padded fabric was passed at a rate of 2 yards per minute between two 1,000 watt infrared lamps Fostoria-Fannon, Inc., Infrared Heater Model 6624), with each lamp shining on opposite surfaces of the fabric from a distance of about 3 inches. The continuously-moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., at 90–95° C. in water containing 1% of an ether-alcohol sulfate detergent, in water at 90–95° C., and in water at 20–30° C. The material was dried and then scoured for 5 minutes in perchloroethylene at 50° C. Uniform deep blue shades of good fastness were produced.

(B) Experiment A was repeated except that the heating was carried out as follows: The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C. where the total contact time was about 90 seconds.

(C) Experiment A was repeated except that the dye of Example 2 was employed. The polyester/cotton blend fabric was uniformly dyed a deep blue shade of good fastness.

(D) Experiment C was repeated except that the heating was carried out as in Experiment B.

Dyeing cotton broadcloth (E) Experiment A was repeated except that a 100% mercerized cotton broadcloth was employed, the amount of glycol was increased to 150 grams, and the maximum temperature was reduced to about 180° C. The cotton cloth was dyed a deep, uniform blue shade of good fastness.

(F) Experiment B was repeated, employing the modifications recited in Experiment E.

Printing of 100% cotton fabric (G) A cotton fabric was padded to about 70% pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

|  | Grams |
| --- | --- |
| An aqueous blue paste (15% active ingredient) containing the dye of Example 3 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed in a blue shade.

Printing of 65/35 "Dacron" polyester/cotton blend fabric (H) Experiment G was repeated except that a 65/35 "Dacron" polyester/cotton fabric was employed and the maximum temperature was increased to 200° C.

Dyeing of "Dacron" polyester

The dyes of this invention can be applied to synthetic fibers by conventional aqueous or pad-heat procedures. The following experiment shows the amenability of these dyes to the Thermosol process.

(I) "Dacron" polyester fabric was immersed for fifteen minutes at 82° C. in an aqueous bath containing 1% ether-alcohol sulfate surface active agent and 1% tetrasodium pyrophosphate. The fabric was rinsed in cold water, dried and then padded at 40-50% pickup, based on dry fabric weight, in a dyebath containing:

|  | Grams |
| --- | --- |
| An aqueous blue dye paste (15% active ingredient) containing the dye of Example 1 | 50 |
| Purified natural gum thickener | 20 |
| Water to 1 liter. | |

The padded material was passed through an infrared predryer, then heated to and held at 213° C. for 90 seconds. The fabric was rinsed in water at 27° C., scoured for 5 minutes at 93° C. in water containing 1% ether-alcohol sulfate detergent, rinsed in water at 277° C. and dried. The polyester fabric was dyed a deep blue shade.

Printing of "Dacron" polyester

The following experiment shows the usefulness of the dyes of this invention in the dry transfer-color printing of synthetic fabrics. It also shows the non-usefulness of a dye of similar structure to the dyes of this invention.

(J) A strip of white bond paper was roller-printed across half its width in a pattern with a print paste consisting of:

|  | Grams |
| --- | --- |
| An aqueous blue paste (15% active ingredient) containing the dye of Example 1 | 5 |
| Sodium alginate thickener (6% in water) | 60 |
| Water | 35 |

The paper was air-dried.

An identical pattern was printed on the unprinted part of the paper with a print-paste containing the same amounts of dye, water and thickener except that the dye of Example 1 was replaced by the dye of the structure

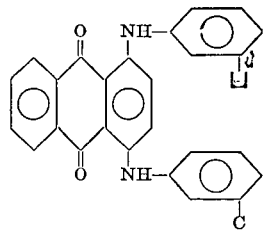

This dye was prepared by replacing m-aminobenzotrifluoride with an equimolar amount of m-chloroaniline in the procedure of Example 1.

The paper was air-dried once again. It was then placed with its printed side against a strip of "Dacron" polyester fabric. An iron at 204–216° C. was placed on the paper for 2 minutes and then removed.

The polyester exhibited a deep blue pattern of the dye of Example 1 but only a very light blue pattern of the 1,4-bis(m-chloroanilino)anthraquinone. This is particularly unexpected since the molecular weight of the dye of Example 1 (526.4) is significantly greater than that of the chloroanilino analogue (459.3) and it would be anticipated that such a process of application would favor the smaller dyes.

Similar results were achieved with this printing technique when the fabric to be printed was swollen cellulose or a polyester/swollen cellulose blend (as in Experiments G and H).

Fabric samples from Experiments A and C were evaluated for fastness using standard tests described in "Textile Manual of American Association of Textile Chemists and Colorists," vol. 45, 1969. The results are reported in the following table. The first three columns show the shade change of the dyed fabric and the next two show the degree of stain on an undyed acetate or nylon fabric. The washfastness test was carried out three times. The ratings are expressed with the following symbols:

5=negligible shade change
4=slight shade change
3=noticable shade change
2=considerable shade change
1=much shade change
W=weaker
G=greener.

TABLE

| Fabric | Lightfastness (xenon arc) | | Washfastness (AATCC 61-1968, No. IIIA) | | |
| --- | --- | --- | --- | --- | --- |
|  | 20 hrs. | 40 hrs. | Shade change | Acetate | Nylon |
| Experiment A | 5–4 W | 4–W | 4–3 G, 4 W | 5 | 5–4 |
| Experiment C | 5–4 W | 5–4 W | 4–3 G, W | 5 | 5–4 |

The following examples illustrate the preparation of dyes of this invention. All parts are given by weight.

EXAMPLE 1

A mixture of 8.5 parts of quinizarin, 5.6 parts of leucoquinizarin, 75.8 parts of m-aminobenzotrifluoride, 10 parts of boric acid and 55 parts of oxybis (2-ethylacetate) was heated to 130° C. in 30 minutes. After maintaining this temperature for 1 hour the reaction mixture was allowed to cool with stirring to 50° C.; 40 parts of ethanol were then added. The reaction mixture was stirred for another 1 hour and the solids were isolated by filtration, washed with ethanol and then dried. 22 parts of product were obtained, melting at 248–249° C. Thin layer chromatography on silica gel-coated glass, using benzene:acetonitrile=19:1 as eluent, indicated no colored impurities in the blue dye. The dye showed absorption maxima at 380, 590 and 627 mµ (in dimethyl acetamide: water=

4:1). Found (percent): C, 63.3, 62.7; H, 3.1, 3.0; F, 21.4, 21.4; N, 5.6, 5.6. Calc'd for $C_{28}H_{16}F_6N_2O_2$ (percent): C, 63.9; H, 3.0; F, 21.7; N, 5.3.

Based on the above, the structure of the dye is

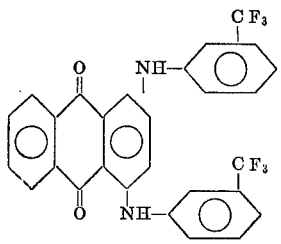

EXAMPLE 2

A mixture of 19 parts of 1,4-diaminoanthraquinone, 45 parts of p-bromobenzotrifluoride, 8 parts of sodium carbonate, 8 parts of sodium acetate, 0.5 part of copper bronze, 0.5 part of cuprous chloride and 0.2 part of potassium iodide in 190 parts of nitrobenzene was stirred under nitrogen at 180–190° C. for 19 hours. The reaction mixture was then allowed to cool with stirring to 80° C. whereupon 160 parts of isopropanol were added. After stirring for 3 hours the solids were isolated by filtration and then washed with hot ethanol. The solids were reslurried in water at 70°–75° C., filtered and then dried. The product (33 parts) had a melting point of 265–270° C. Thin layer chromatography indicated traces of a green and a violet impurity in the blue product. The dye exhibited absorption maxima at 393, 587 and 623 mμ (in dimethyl acetamide:water). Found (percent): F, 20.7, 20.7; N, 5.6, 5.2. Calc'd for $C_{28}H_{16}F_6N_2O_2$ (percent): F, 21.7; N, 5.3.

Based on the above, the structure of the dye is

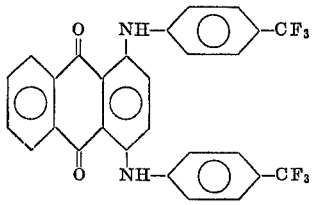

EXAMPLE 3

A mixture of 47.9 parts of 1,4-diaminoanthroquinone, 100 parts of o-bromobenzotrifluoride, 38.5 parts of sodium carbonate, 8.6 parts of potassium acetate, 2.4 parts of cuprous chloride and 87 parts of nitrobenzene was stirred at 185–190° C. for 13.5 hours. The reaction mixture was allowed to cool to 90–100° C. and 85 parts of Cellosolve were added. After stirring for 90 minutes at 90–100° C. the mixture was cooled to 50° C. and then poured into a mixture of 530 parts of methanol and 60 parts of concentrated hydrochloric acid. After stirring for 2 hours, the solids were isolated by filtration, washed with methanol-hydrochloric acid and sucked dry. The solids were reslurried in a mixture of 530 parts of methanol and 60 parts of concentrated hydrochloric acid, stirred at 50° C. for 1 hour and isolated by filtration. The solids were washed with methanol-hydrochloric acid and dried. The yield was 102 parts of blue dye. Based on the above, the structure of the dye is

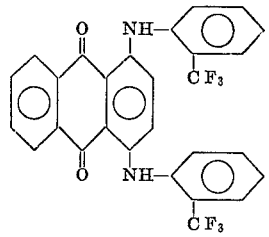

The embodiments of the invention in which an exclusive property or privilege is claimed are defined as follows:

1. Blue water insoluble dye having the formula

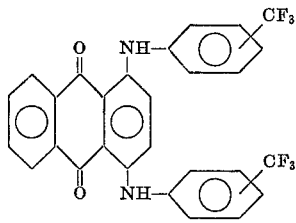

2. The dye of claim 1 having the formula

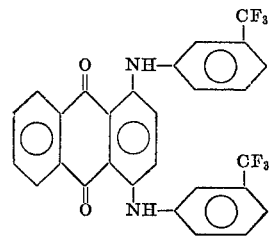

References Cited

FOREIGN PATENTS 1,142,136   2/1969   Great Britain _____ 260—380

LORRAINE A. WEINBERGER, Primary Examiner

R. GERSTL, Assistant Examiner

U.S. Cl. X.R.

8—39.40